United States Patent [19]

Pawelzik et al.

[11] Patent Number: 5,172,941
[45] Date of Patent: Dec. 22, 1992

[54] SNAP-RING ASSEMBLY

[75] Inventors: Manfred Pawelzik, Soest; Friedhelm Weise, Fröndenberg, both of Fed. Rep. of Germany

[73] Assignee: Friedrich Grohe Aktiengesellschaft, Hemer, Fed. Rep. of Germany

[21] Appl. No.: 769,294

[22] Filed: Oct. 1, 1991

[30] Foreign Application Priority Data

Oct. 26, 1990 [DE] Fed. Rep. of Germany ....... 4034088

[51] Int. Cl.⁵ .............................................. F16L 35/00
[52] U.S. Cl. ...................................... 285/39; 285/321
[58] Field of Search ................................... 285/321, 39

[56] References Cited

U.S. PATENT DOCUMENTS

| | | | |
|---|---|---|---|
| 472,342 | 4/1892 | Droudt | 285/321 X |
| 2,525,667 | 10/1950 | Goolsbee et al. | 285/321 X |
| 2,935,343 | 5/1960 | Ellis | 285/321 X |
| 3,521,911 | 7/1970 | Hones et al. | 285/321 X |
| 3,560,026 | 2/1971 | Roe | 285/321 X |
| 4,298,219 | 11/1981 | Amelink | 285/321 X |

FOREIGN PATENT DOCUMENTS 570671 7/1945 United Kingdom ................ 285/321

OTHER PUBLICATIONS

DIN 7993.

*Primary Examiner*—Dave W. Arola
*Attorney, Agent, or Firm*—Herbert Dubno; Andrew Wilford

[57] ABSTRACT

A snap-ring assembly has a sleeve formed with a bore centered on an axis and having an axially outwardly open end formed with a radially inwardly open groove, a pipe having a collar projecting axially inward into the bore end past the groove, a snap ring seated in the groove and projecting axially into the bore to block outward displacement of the collar, and a seal ring in the bore between the collar and the sleeve. The sleeve is formed at its open end with an axially outwardly open notch extending axially inward generally to the groove so that a tool can be inserted in the groove under the snap ring to remove same from the groove.

4 Claims, 1 Drawing Sheet

SNAP-RING ASSEMBLY

FIELD OF THE INVENTION

The present invention relates to a snap-ring assembly. More particularly this invention concerns such an assembly used on a faucet riser or feed tube.

BACKGROUND OF THE INVENTION

A standard snap ring such as described in DIN 7993 is seated in a radially inwardly open groove formed in the inner surface of a sleeve or the like to limit axial movement of another element fitting snugly in the sleeve., Such a connection is extremely simple to make as the one element is slid into the sleeve and then the snap ring is pushed in behind it until it snaps into place in the groove. The ring is solely stressed in shear and therefore forms a very strong connection.

The main problem with such an internal snap ring is that it is extraordinarily difficult to remove it. In a application such as at the end of a faucet riser pipe this type of snap ring might, however, need to be removed so that an O-ring normally provided inboard of it can be replaced.

OBJECTS OF THE INVENTION

It is therefore an object of the present invention to provide an improved internal snap-ring assembly.

Another object is the provision of such an improved internal snap-ring assembly which overcomes the above-given disadvantages, that is which can be disassembled relatively easily.

SUMMARY OF THE INVENTION

A snap-ring assembly has a sleeve formed with a bore centered on an axis and having an axially outwardly open end formed with a radially inwardly open groove, a pipe having a collar projecting axially inward into the bore end past the groove, a snap ring seated in the groove and projecting axially into the bore to block outward displacement of the collar, and a seal ring in the bore between the collar and the sleeve. According to the invention the sleeve is formed at its open end with an axially outwardly open notch extending axially inward generally to the groove so that a tool can be inserted in the groove under the snap ring to remove same from the groove.

Thus disassembly of the joint is a relatively simple job, simply entailing prying out the ring. Since the seal ring is located wholly inward of the snap ring, the removal notch will not in any way interfere with the seal between the two elements.

According to this invention the notch is radially throughgoing and the ring is formed of a wire having a predetermined diameter and the notch has an angular width, equal to about twice the wire diameter. Furthermore the notch has a floor spaced axially inward of the wire by a distance equal to at least the diameter. Thus the relatively narrow groove will not perceptibly weaken the strength of the snap-ring coupling.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
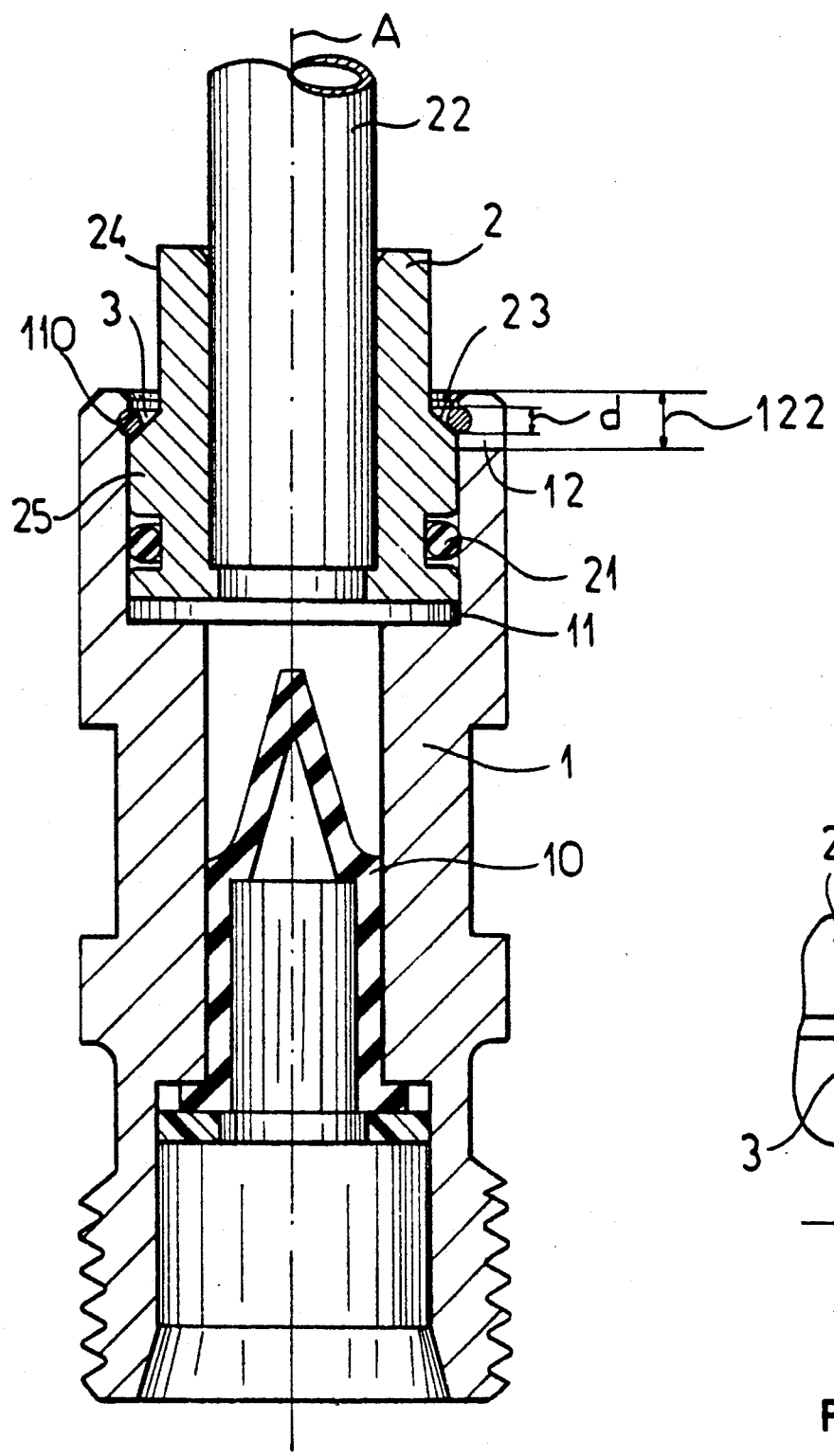
FIG. 1 is an axial section through the assembly according to the invention.
Figure 2:
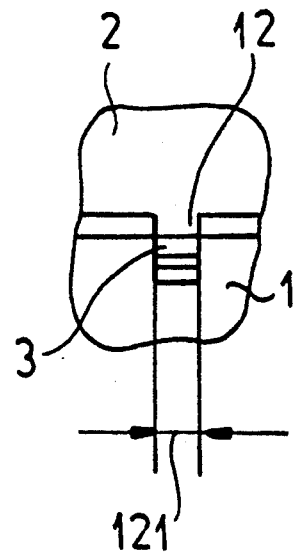
FIG. 2 is a side view of a detail of FIG. 1.

As seen in FIGS. 1 and 2 a snap-ring assembly basically comprises a base sleeve 1 formed with a throughgoing stepped bore 11 centered on an axis A and a pipe 22 to whose end is welded a collar 2. The collar 2 is formed with a radially outwardly open groove holding an O-ring 21 that radially outwardly engages the interior of the bore 11, and the sleeve 1 is provided with an elastomeric check valve 10.

According to this invention the mouth of the bore 11 is formed with a radially inwardly open semicircular-section groove 110 in which is seated a spring-steel snap ring 3 of complementary circular section. The collar 2 has a 45° frustoconical surface 23 extending between a small-diameter cylindrical surface 24 and a large-diameter cylindrical surface 25, the latter of which is a snug fit in the bore 11. This surface 24 cams the snap ring 3 into tight engagement into the groove 110.

According to the invention the sleeve 1 is formed at the mouth of the bore 11 with an axially outwardly open and radially throughgoing notch 12 having an angular width 121 equal to about twice the diameter d of the ring 3. Below the notch 12 the bore 11 is annularly continuous, that is the sleeve 1 is not otherwise split. This notch 12 also has an axial depth such that its floor lies axially inward past the ring 3 by a distance equal to the diameter d. Thus if the seal ring 21 fails or for another reason it is necessary to separate the sleeve 1 from the collar 2 and pipe 22, a screwdriver can be put in the notch 12 under the ring 3 where it is exposed there to lever it out.

We claim:

1. In a snap-ring assembly having:
   a sleeve formed with a bore centered on an axis and having an axially outwardly open end formed with a radially inwardly open groove;
   a pipe having a collar projecting axially inward into the bore end past the groove;
   a nap ring seated in the groove, wholly enclosed within the sleeve, and projecting radially into the bore to block outward displacement of the collar; and
   a seal ring in the bore between the collar and the sleeve,
   the improvement wherein the sleeve is formed at its open end with an axially outwardly open and radially throughgoing notch extending axially inward and having a floor spaced axially inward of the snap ring and wherein the groove and snap ring are complementarily shaped so that the snap ring is snugly received in the groove thereby preventing the snap ring from axially shifting in the groove, whereby a tool can be inserted in the groove under the snap ring to remove same from the groove.

2. The improved snap-ring assembly defined in claim 1 wherein the ring is formed of a wire having a predetermined diameter and the notch has an angular width equal to about twice the wire diameter.

3. The improved snap-ring assembly defined in claim 1 wherein the ring is formed of wire and the wire is of circular section and has a predetermine diameter and the notch floor is spaced axially inward of the snap ring by a distance equal to at least the diameter.

4. The improved snap-ring assembly defined in claim 1 wherein the sleeve is annularly continuous and unsplit axially inward of the notch.

* * * * *